(12) United States Patent
Hauser

(10) Patent No.: US 8,961,088 B2
(45) Date of Patent: Feb. 24, 2015

(54) EXPANDING RIVET

(75) Inventor: Ingo Hauser, Kandern (DE)

(73) Assignee: A. Raymond et Cie, Grenoble (FR)

( * ) Notice: Subject to any disclaimer, the term of this patent is extended or adjusted under 35 U.S.C. 154(b) by 156 days.

(21) Appl. No.: 13/812,081

(22) PCT Filed: Jul. 12, 2011

(86) PCT No.: PCT/EP2011/061872
§ 371 (c)(1),
(2), (4) Date: Jan. 24, 2013

(87) PCT Pub. No.: WO2012/016797
PCT Pub. Date: Feb. 9, 2012

(65) Prior Publication Data
US 2013/0136559 A1    May 30, 2013

(30) Foreign Application Priority Data

Aug. 5, 2010   (DE) .......................... 10 2010 033 484

(51) Int. Cl.
*F16B 13/06* (2006.01)
(52) U.S. Cl.
USPC ............................................. 411/45; 24/297
(58) Field of Classification Search
USPC ...................... 411/41, 44, 45, 46, 48; 24/297
IPC .................................................. F16B 19/1081
See application file for complete search history.

(56) References Cited

U.S. PATENT DOCUMENTS

| 4,952,106 | A | * | 8/1990 | Kubogochi et al. | ............. 411/48 |
| 5,211,519 | A | * | 5/1993 | Saito | ............... 411/45 |
| 5,370,484 | A | | 12/1994 | Morikawa et al. | |
| 5,375,954 | A | | 12/1994 | Eguchi | |
| 5,632,581 | A | * | 5/1997 | Hasada | ............... 411/48 |
| 5,850,676 | A | | 12/1998 | Takahashi et al. | |
| 6,514,023 | B2 | * | 2/2003 | Moerke | ........................... 411/45 |
| 6,540,461 | B1 | * | 4/2003 | Hawang | ........................ 411/48 |
| 6,616,479 | B1 | * | 9/2003 | Jones | ........................... 439/567 |
| 2004/0020016 | A1 | * | 2/2004 | Yoneoka | ........................ 24/297 |

FOREIGN PATENT DOCUMENTS

| EP | 0557074 A1 | 8/1993 |
| GB | 2173851 A | 10/1986 |
| GB | 2335951 A | 10/1999 |

OTHER PUBLICATIONS

Written Opinion and International Search Report mailed Sep. 28, 2011 in International Patent Application No. PCT/EP2011/061872.

* cited by examiner

*Primary Examiner* — Gary Estremsky
(74) *Attorney, Agent, or Firm* — Faegre Baker Daniels LLP

(57) ABSTRACT

An expanding rivet formed with a rivet body and with a rivet pin includes foot webs formed on the rivet pin, which foot webs project laterally in a pre-fitting position relative to spring arms formed on the rivet body. As a result, the free ends of the spring arms are protected against damage when the expanding rivet is inserted into a locating recess.

6 Claims, 6 Drawing Sheets

EXPANDING RIVET

CROSS-REFERENCE TO RELATED APPLICATIONS

This application is a U.S. National Phase Patent Application based on International Application No. PCT/EP2011/061872 filed Jul. 12, 2011, which claims priority to German Patent Application No. 10 2010 033 484.7 filed Aug. 5, 2010, the entire disclosures of which are hereby explicitly incorporated by reference herein.

BACKGROUND OF THE INVENTION

1. Field of the Invention

The present invention relates to an expanding rivet.

2. Description of the Related Art

One known expanding rivet is disclosed in EP 0 557 074 A1. The prior expanding rivet comprises a rivet body having a number of expansion arms. The expansion arms are formed on an insertion portion, extend away from the insertion portion and terminate in a free end. Also present is a rivet pin, which is mounted displaceably in a longitudinal direction in the rivet body and by means of which the expansion arms can be moved radially outward in a pushed-in, final mounted position of the rivet pin. In the region of an insertion end directed away from a handling end, the rivet pin has a rear catch surface which faces toward the insertion end, and which is confronted by the free ends of the expansion arms in a preliminary mounted position of the rivet pin. In the preliminary mounted position, the free ends of the expansion arms are spaced apart from the rear catch surface and reach around a front catch step that is disposed before the rear catch surface in the insertion direction of the rivet pin.

SUMMARY OF THE INVENTION

The present invention provides an expanding rivet which, when said expanding rivet is fitted into a laid-on part and a support part that are to be connected to each other by the expanding rivet, is distinguished by reliable protection of the free ends of the expansion arms, particularly even if said free ends are delicately shaped.

By virtue of the fact that the expanding rivet according to the invention comprises radially projecting foot webs which in the preliminary mounted position protrude in the radial direction beyond the free ends of the expansion arms in the region of the rear catch surface, the free ends of the expansion arms are protected against contact with an add-on part and/or a support part that are to be connected to each other by the expanding rivet, particularly such that even expansion arms that are relatively delicately shaped in the region of the free ends do not accidentally bend and hinder the insertion of the expanding rivet if they accidentally come into contact with an add-on part and/or a carrier part.

In one form thereof, the present invention provides an expanding rivet including a rivet body having a number of expansion arms that are formed on an insertion portion, extend away from the insertion portion and terminate in a free end, and including a rivet pin, which is mounted displaceably in a longitudinal direction in the rivet body and by means of which the expansion arms can be moved radially outward in a pushed-in, final mounted position of the rivet pin, the rivet pin having, in the region of an insertion end directed away from a handling end, a rear catch step that faces away from the handling end and is confronted by the free ends of the expansion arms in a preliminary mounted position of the rivet pin, characterized in that the rivet pin has a number of laterally protruding foot webs that extend away from the rear catch step toward the handling end and in a preliminary mounted position protrude radially outward beyond the expansion arms in an end portion adjacent the rear catch step.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
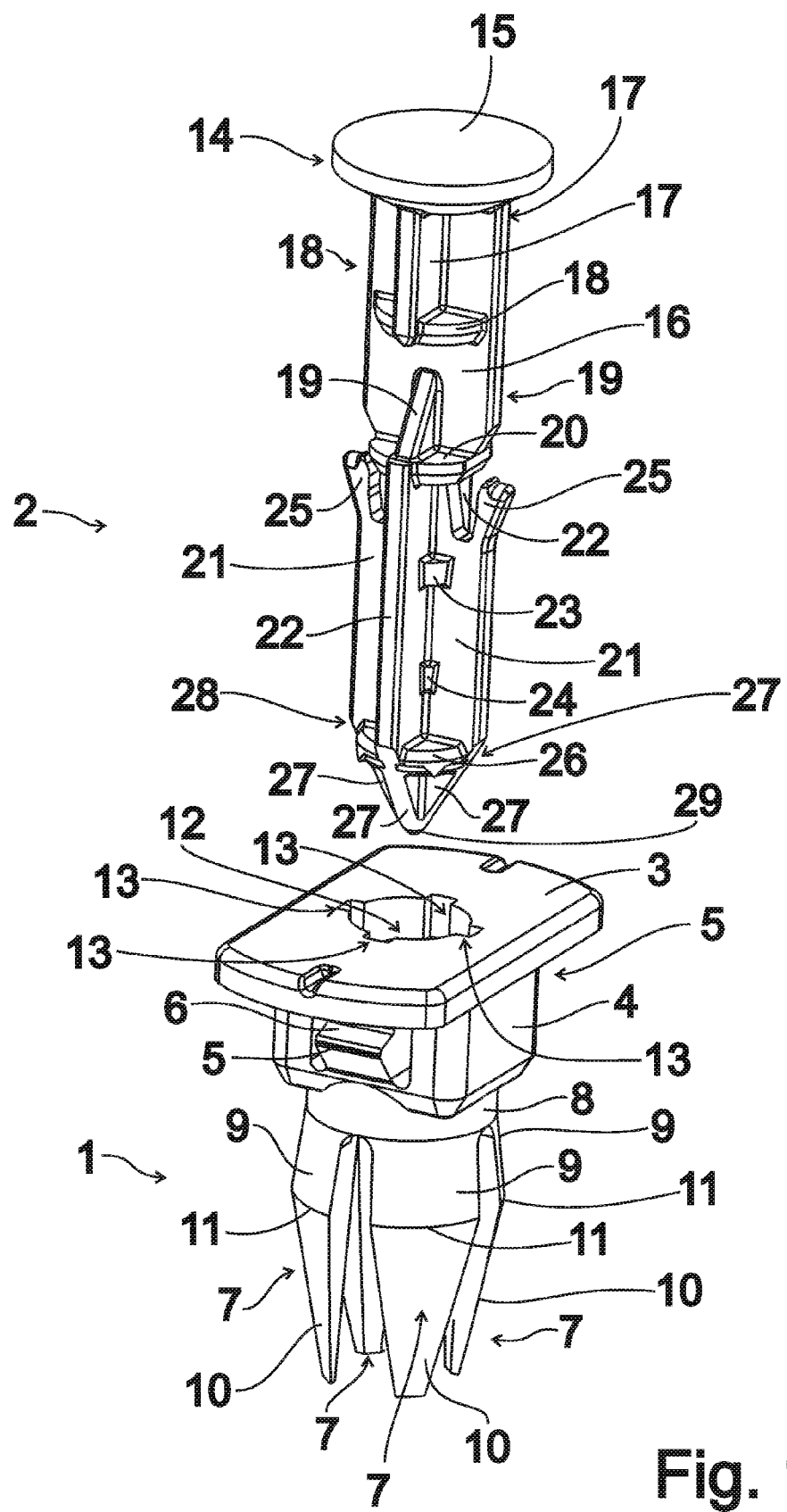
FIG. 1 is an exploded perspective view of an exemplary embodiment of an expanding rivet comprising a rivet body and a rivet pin.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is an exploded perspective view of an exemplary embodiment of an expanding rivet according to the invention, comprising a rivet body 1 and a rivet pin 2 that is mounted displaceably in the longitudinal direction in the rivet body 1. In the exemplary embodiment shown, the rivet body 1 is configured with an approximately rectangularly shaped bearing plate 3, on one side of which is formed an approximately square-shaped insertion portion 4. Formed on mutually opposite sides of the insertion portion 4 are two rear-engaging lugs 5 with rear catch surfaces 6 facing toward the bearing plate 3, which protrude laterally outward beyond the insertion portion 4.

On the side of insertion portion 4 facing away from bearing plate 3, the rivet body 1 in this exemplary embodiment has four spring arms 7, which are formed on the insertion portion 4 via an extension portion 8 having a round cross section. Each spring arm 7 is configured with a trailing bevel 9 adjacent the extension portion 8 and with a leading bevel 10 that faces away from the extension portion 8 and terminates in a free end of the respective spring arm 7. In a relaxed arrangement of the spring arms 7, each trailing bevel 9 is splayed outwardly relative to the extension portion 8, whereas the leading bevels 10 converge starting from a parting line 11 formed between the particular trailing bevel 9 and the particular leading bevel 10, tapering the spring arms 7 down to the thus delicately configured free ends at an angle to the longitudinal direction of no more than approximately 45 degrees, preferably of no more than 20 degrees.

The bearing plate 3 and the insertion portion 4 each have a respective pin opening 12 that extends in the longitudinal direction of the rivet body 1 and is configured with a substantially round cross section comprising radially outwardly projecting guide slots 13, each of which has a 90 degree angled portion.

The rivet pin 2 is provided at a handling end 14 with a disk-like actuating plate 15, on which is formed a slat-like connecting portion 16 with a rectangular cross section, extending in a longitudinal direction. Formed on the flat sides of the connecting portion 16 are head webs 17, which extend approximately to the middle of connecting portion 16 and at whose ends directed away from the actuating plate 15 are formed semicircular bracing plates 18, each with its straight edge side adjacent the connecting portion 16.

Formed on the connecting portion 16 at a distance from the bracing plates 18 are wedge-like transition webs 19, which extend outward from an end facing toward the actuating plate 15 and are connected to an intermediate plate 20 formed at an end of the connecting portion 16 directed away from the actuating plate 15.

On the side of intermediate plate 20 facing away from actuating plate 15, the rivet pin 2 comprises foot webs 21, 22, each of rectangular cross section, which are connected to each other in pairs, each by a long side, in mutually perpendicular orientation. For purposes of stabilization, a number of stabilizing filler pieces 23, 24 are present between the foot webs 21, 22.

At the end facing away from the intermediate plate 20, two mutually aligned foot webs 21, 22 each have a respective resilient securing lug 25 that is splayed outwardly relative to connecting portion 16, intermediate plate 20 and foot portion 21. At the end of foot portion 21 directed away from intermediate plate 20, the rivet pin 2 is configured with a protective plate 26 that forms a rear catch step facing away from the handling end 14 and is adjoined by the foot webs 21, 22.

On the side of the protective plate 26 facing away from the actuating plate 15, the rivet pin 2 comprises tip webs 27 disposed in prolongation of the foot webs 21, 22 and extending convergingly away from the protective plate 26, terminating in an insertion tip 29 in the region of an insertion end 28 that is disposed oppositely from the handling end 14.

Figure 2:
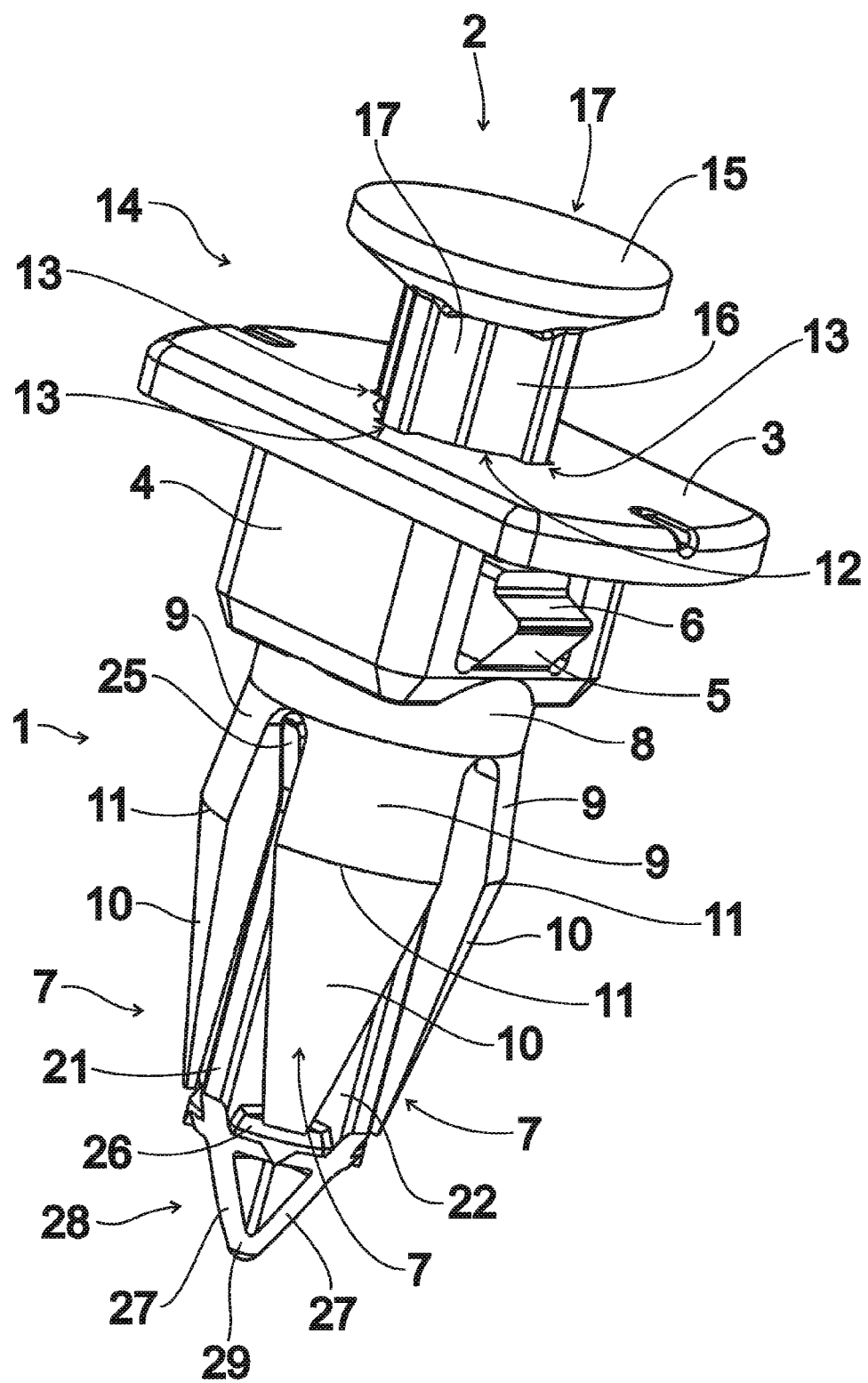
FIG. 2 is a perspective view of the exemplary embodiment of an expanding rivet according to the invention as depicted in FIG. 1, with the rivet pin pushed into the rivet body to a preliminary mounted position.

FIG. 2 is a perspective view of the exemplary embodiment of an expanding rivet according to the invention as depicted in FIG. 1 in a preliminary mounted position, in which the rivet pin 2 has been pushed sufficiently far into the rivet body 1 that the free ends of the spring arms 7 are disposed on the side of the protective plate 26 facing away from the insertion tip 29. In the preliminary mounted position, the free ends of the spring arms 7 retreat in the radial direction behind the outer edges of the foot webs 21, 22 and are approximately flush with the outer side of the protective plate 26. The free ends of the spring arms 7 are thus arranged in a protected manner in the preliminary mounted position according to FIG. 2.

To insert the rivet pin 2 into the rivet body 1, the rivet pin 2 is oriented so that the foot webs 21, 22 engage in the guide slots 13. To secure the rivet pin 2 in the preliminary mounted position against accidental withdrawal of the rivet pin 2 from the rivet body 1, each securing lug 25 engages from behind a side, facing away from the bearing plate 3, of a respective clearance formed between adjacent spring arms 7.

Figure 3:
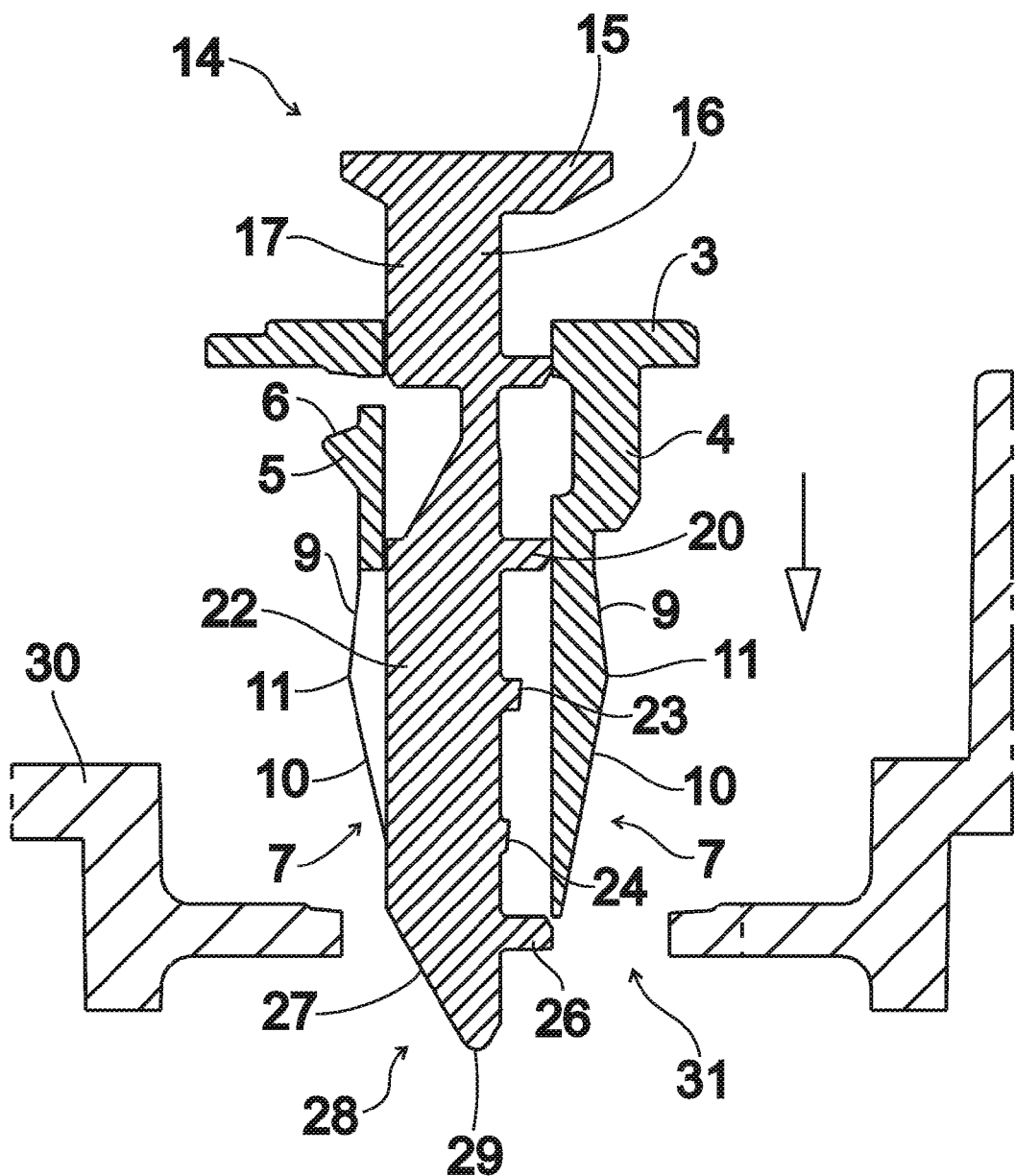
FIG. 3 is a sectional view of the exemplary embodiment according to FIG. 1 prior to arrangement in an add-on part, with the rivet pin in the preliminary mounted position of FIG. 2.

FIG. 3 is a sectional view, in a section plane that is at an angle to the longitudinal axis, of the exemplary embodiment according to FIG. 1 in the preliminary mounted position according to FIG. 2, prior to arrangement in an add-on part receiving opening 31 formed in an add-on part 30. It is apparent from the representation of FIG. 3 that owing to the inwardly disposed, protected arrangement of the free ends of the spring arms 7, the rivet body 1 can be inserted into the add-on part receiving opening 31 without damage even if the outer sides of the rivet body 1 or the rivet pin 2 collide with the edges of the add-on part receiving opening 31, since the foot webs 21, 22 protruding outwardly beyond the leading bevels 10 in the region of the insertion end 28 furnish reliable protection against deformation.

Figure 4:
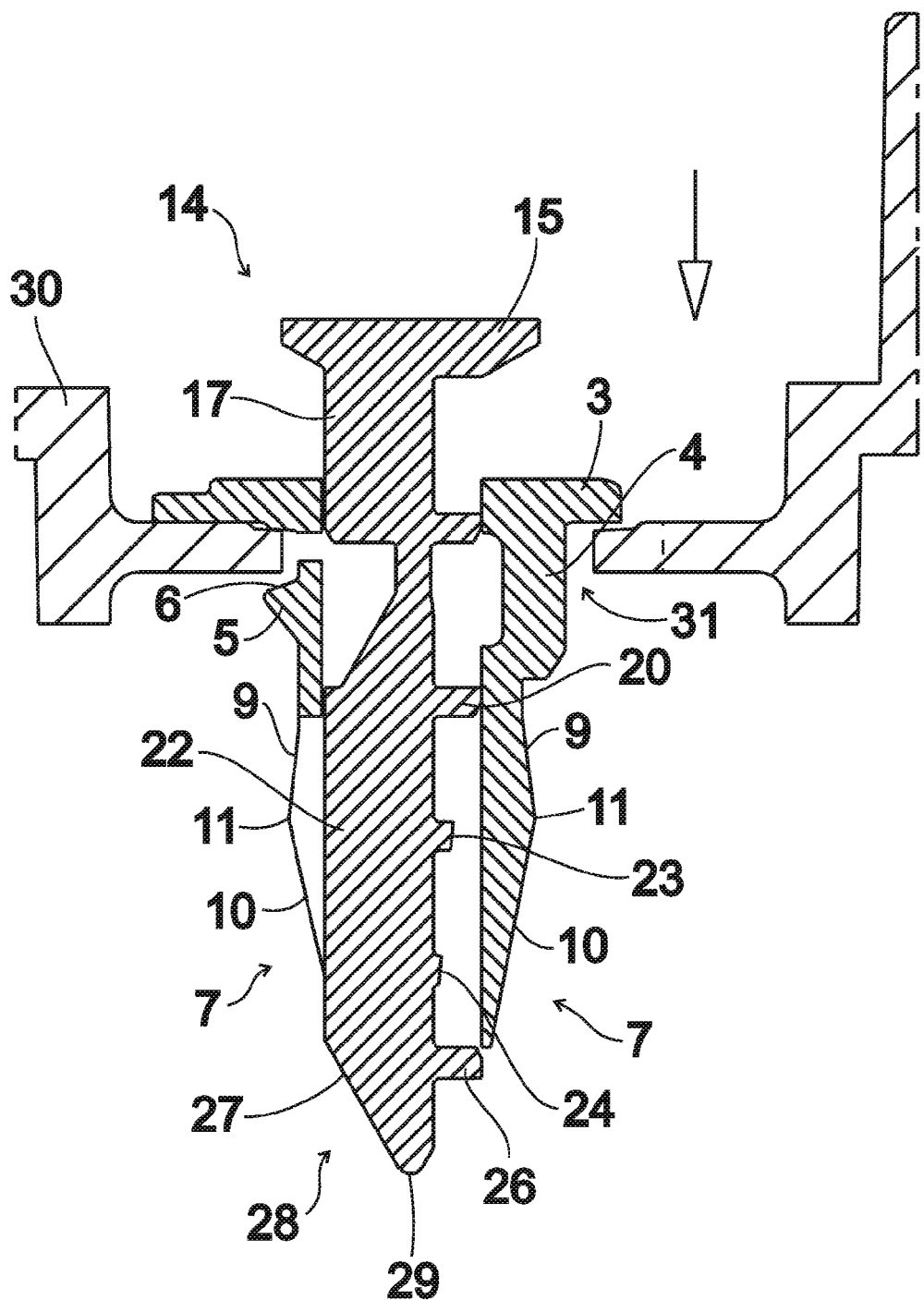
FIG. 4 is a sectional view of the exemplary embodiment according to FIG. 1 in the preliminary mounted position according to FIG. 2, in an arrangement of being fitted into the add-on part.

FIG. 4 is a sectional view of the exemplary embodiment according to FIG. 1 in the preliminary mounted position of FIG. 2 and in an arrangement of being fitted into the add-on part 30, in which arrangement the rear-engaging lugs 5 engage by their rear catch surfaces 6 behind the side of add-on part receiving opening 31 facing away from the bearing plate 3 and secure the rivet body 1 in the add-on part receiving opening 31.

Figure 5:
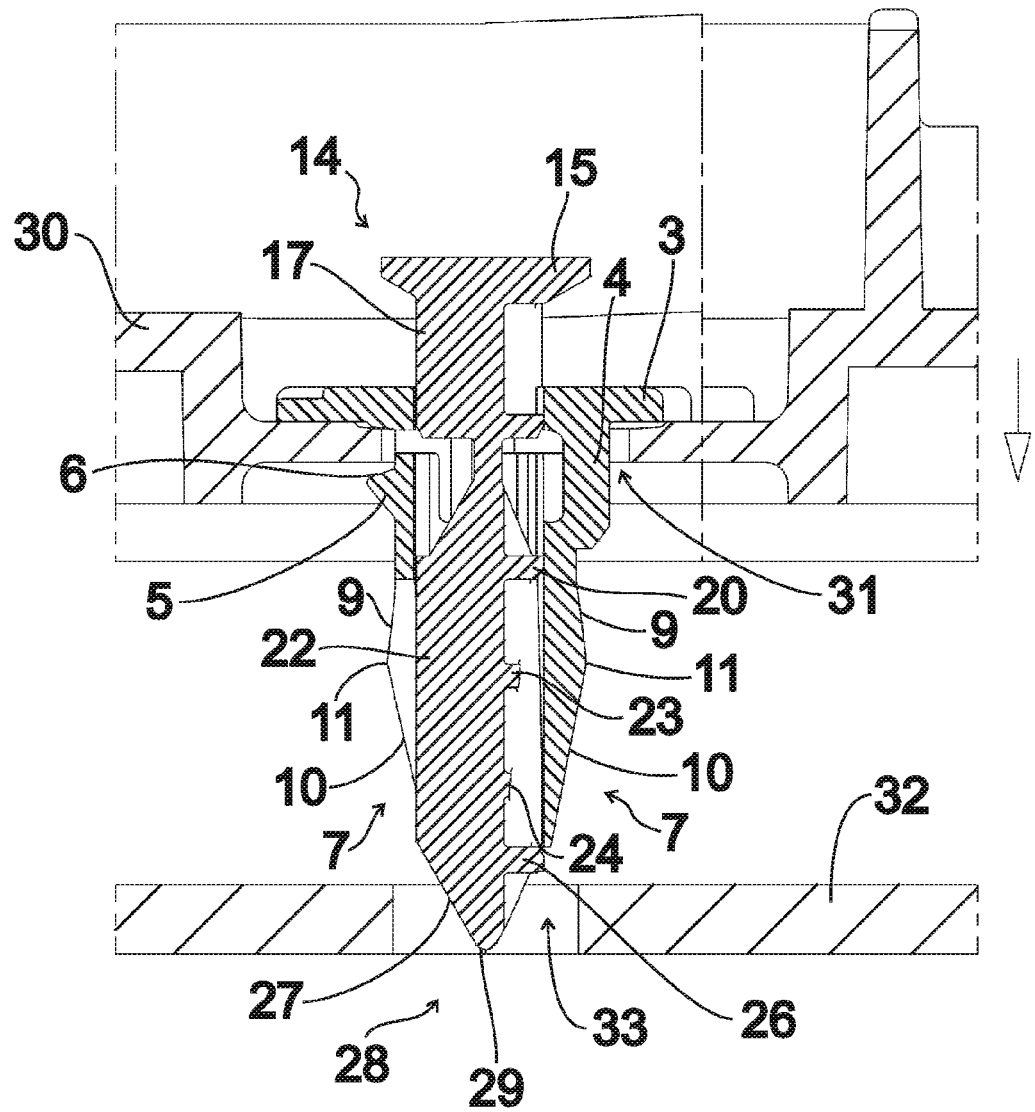
FIG. 5 is a sectional view of the exemplary embodiment according to FIG. 1 with the rivet pin in the preliminary mounted position of FIG. 2, in the arrangement of FIG. 4 of being fitted into the add-on part prior to insertion in a support part.

FIG. 5 is a sectional view of the exemplary embodiment of an expanding rivet according to the invention as depicted in FIG. 1, with the rivet pin 2 in the preliminary mounted position according to FIG. 2 and in the arrangement of being fitted into the add-on part 30 as depicted in FIG. 4, prior to insertion in a support part receiving opening 33 formed in a support part 32. It can be seen from FIG. 5 that the foot webs 21, 22 also furnish protection for the inwardly disposed free ends of the spring arms 7 during the insertion of the inventive expanding rivet in the support part receiving opening 33.

Figure 6:
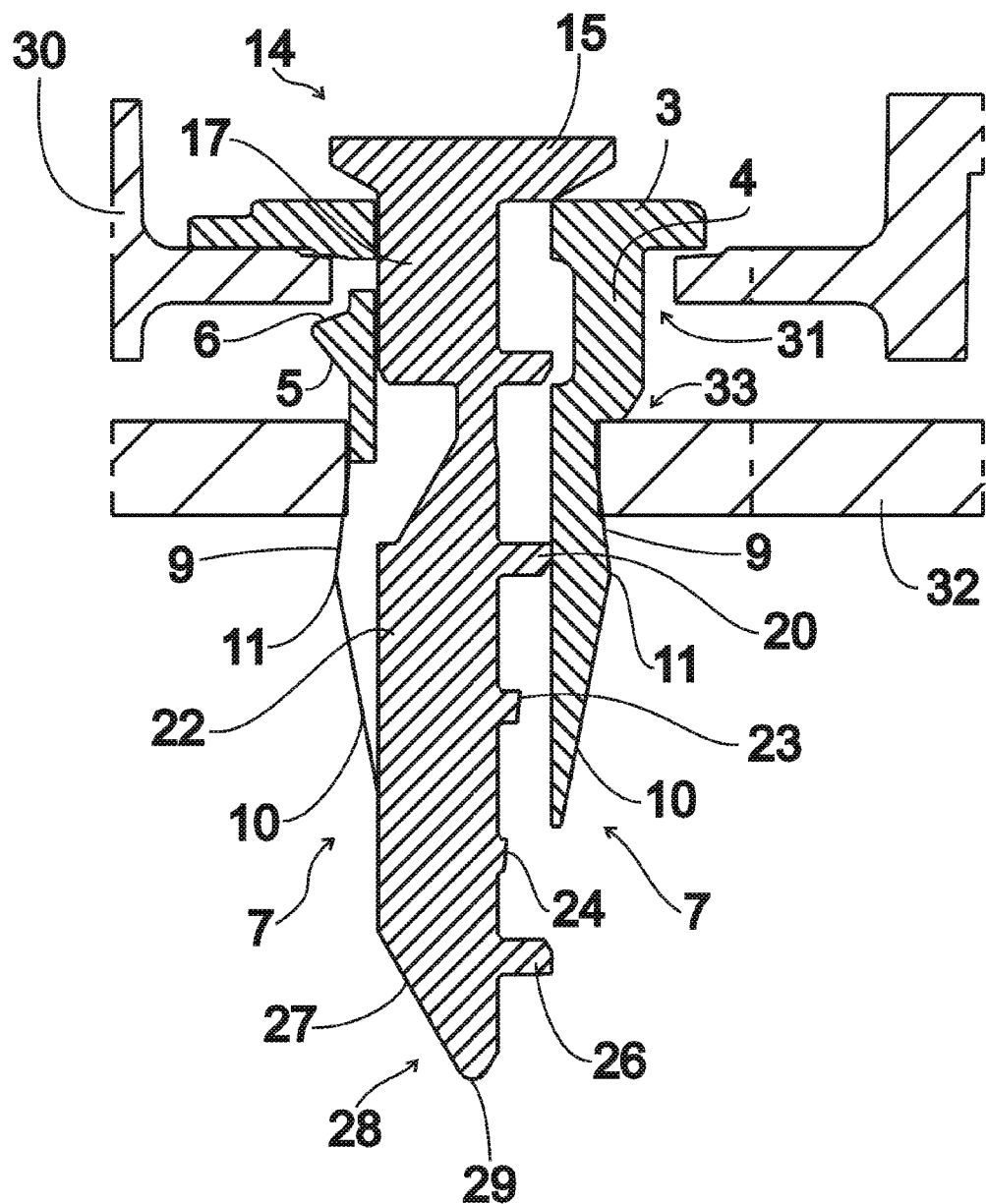
FIG. 6 is a sectional view of the exemplary embodiment according to FIG. 1 with the rivet pin in an arrangement of being fitted into the support part and with the rivet pin in a final mounted position.

FIG. 6 is a sectional view of the exemplary embodiment of an expanding rivet according to the invention as depicted in FIG. 1 in an arrangement of being fitted into the support part 32 and with the rivet pin 2 in a final mounted position, in which the rivet pin 2 has been pushed into the rivet body 1 until the actuating plate 15 comes into abutment against the bearing plate 3. In the final mounted position of the rivet pin 2, the intermediate plate 20 now rests against the spring arms 7 on the side of support part 32 facing away from bearing plate 3, with the result that the spring arms 7 are clamped by their trailing bevels 9 against the inwardly disposed wall of the support part opening 33 and fix the expanding rivet in the support part 32, thereby connecting the add-on part 30 to the support part 32.

To demount the add-on part 30 from the support part 32 and remove the expanding rivet from the add-on part 30, the rivet pin 2 is withdrawn from the final mounted position of FIG. 6 against the direction of insertion, thus allowing the spring arms 7 to deflect radially inward. Once the securing lugs 25 come into abutment in the clearances between the spring arms 7, on the side facing away from the bearing plate 3, the rivet body 1 comes out as well.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An expanding rivet, comprising:
   a rivet body including an insertion portion and a plurality of expansion arms formed on said insertion portion, each said expansion arm extending away from said insertion portion and terminating in a free end; and
   a rivet pin mounted displaceably in a longitudinal direction in said rivet body, said rivet pin engagable with said expansion arms to move said expansion arms radially outwardly to a pushed-in, final mounted position of said rivet pin, said rivet pin further comprising:
   an insertion end directed away from a handling end;
   a rear catch step disposed proximate said insertion end, said rear catch step facing away from said handling end and disposed adjacent said free ends of said expansion arms in a preliminary mounted position of said rivet pin;
   a plurality of laterally protruding foot webs extending away from said rear catch step toward said handling end which, in said preliminary mounted position, protrude radially outwardly beyond said expansion arms adjacent said rear catch step; and
   a respective radially projecting securing lug formed on each of at least two of said foot webs in a region of said foot webs which is spaced apart from said rear catch step.

2. The expanding rivet of claim 1, wherein said rivet body includes four said expansion arms and said rivet pin includes four said foot webs.

3. The expanding rivet of claim 1, wherein said expansion arms are inclined with respect to said longitudinal direction at an angle of no more than 45 degrees proximate said free ends thereof.

4. The expanding rivet of claim 3, wherein said expansion arms are inclined with respect to said longitudinal direction at an angle of no more than 20 degrees proximate said free ends thereof.

5. The expanding, rivet of claim 1, further comprising a plurality of tip webs formed on a side of said rear catch step facing away from said handling end of said rivet pin, each said tip web aligned with a respective foot web and together converging to a point.

6. The expanding rivet of claim 1, wherein said insertion end of said rivet pin further comprises a protective plate having an outer side and, in said preliminary mounting position, said free ends of said expansion arms are substantially flush with said outer side of said protective plate.

* * * * *